(12) United States Patent
Lewis et al.

(10) Patent No.: US 8,234,901 B2
(45) Date of Patent: Aug. 7, 2012

(54) METHOD TO CREATE BENDS IN COMPOSITE PANELS

(75) Inventors: Michael Steven Lewis, Lake Forest Park, WA (US); Guy Wade Roets, Duvall, WA (US)

(73) Assignee: The Boeing Company, Chicago, IL (US)

( * ) Notice: Subject to any disclaimer, the term of this patent is extended or adjusted under 35 U.S.C. 154(b) by 951 days.

(21) Appl. No.: 11/924,125

(22) Filed: Oct. 25, 2007

(65) Prior Publication Data

US 2009/0107312 A1    Apr. 30, 2009

(51) Int. Cl.
B21D 43/28    (2006.01)

(52) U.S. Cl. ........................................ 72/324

(58) Field of Classification Search ............... 72/31.1, 72/324; 83/33; 52/631, 783.11
See application file for complete search history.

(56) References Cited

U.S. PATENT DOCUMENTS

| | | | |
|---|---|---|---|
| 1,602,164 A | | 10/1926 | Overbury |
| 2,135,000 A | * | 11/1938 | Crouch ........................ 52/631 |
| 2,142,305 A | | 1/1939 | Davis |
| 2,505,789 A | * | 5/1950 | Norquist ...................... 52/631 |
| 2,922,561 A | | 1/1960 | Currivan |
| 3,122,302 A | | 2/1964 | Wood |
| 3,341,908 A | | 9/1967 | Lock |
| 3,456,380 A | | 7/1969 | Cameron |
| 3,890,108 A | * | 6/1975 | Welsh ........................ 428/593 |
| 3,969,868 A | | 7/1976 | Bainter et al. |
| 4,024,684 A | * | 5/1977 | Holmgren ..................... 52/631 |
| 4,387,128 A | | 6/1983 | Emms et al. |
| 4,671,470 A | | 6/1987 | Jonas |
| 4,715,592 A | | 12/1987 | Lewis |
| 4,887,335 A | | 12/1989 | Folkmar |
| 4,917,747 A | | 4/1990 | Chin et al. |
| 5,125,133 A | | 6/1992 | Morrison |
| 5,331,758 A | | 7/1994 | Romick |
| 5,357,728 A | | 10/1994 | Duncanson |
| 5,509,212 A | | 4/1996 | Henricksen |
| 5,557,904 A | | 9/1996 | Dahowski |

(Continued)

FOREIGN PATENT DOCUMENTS

FR    2409855 A1    11/1977

(Continued)

OTHER PUBLICATIONS

U.S. Appl. No. 11/727,762, filed Mar. 28, 2007, Schmitz.

(Continued)

*Primary Examiner* — Teresa M Ekiert
(74) *Attorney, Agent, or Firm* — Yee & Associates, P.C.

(57) ABSTRACT

A method for forming a bend in composite panel. In one advantageous embodiment, a method is used to form a bend in a composite panel. An angle and a radius bend are identified for the bend. A location of the bend in the composite panel is identified. A slot is cut having a curved flange in the composite panel at the identified location in a single pass through the composite panel with a tool, wherein the curved flange has a shape with a bend allowance width and a bend slot width. The bend allowance width is BA=2π*A/360, wherein BA is the bend allowance width, R is a corner radius, and A is a bend angle. The bend slot width is BS=BA−2K(R−T), wherein K is Tan(A/2) and T is a thickness of the composite panel. The composite panel with the slot is bent to form the bend.

23 Claims, 6 Drawing Sheets

U.S. PATENT DOCUMENTS

| | | | |
|---|---|---|---|
| 5,652,039 | A | 7/1997 | Tremain et al. |
| 5,653,003 | A | 8/1997 | Freeman |
| 5,742,983 | A | 4/1998 | Lo |
| 5,755,068 | A * | 5/1998 | Ormiston .................. 52/314 |
| 5,919,545 | A | 7/1999 | Giezendanner et al. |
| 5,940,935 | A | 8/1999 | Julius |
| 6,164,477 | A | 12/2000 | Druckman et al. |
| 6,251,497 | B1 | 6/2001 | Hoopingarner et al. |
| 6,295,786 | B1 * | 10/2001 | Lee ............... 52/745.19 |
| 6,325,568 | B1 | 12/2001 | Druckman et al. |
| 6,453,973 | B1 | 9/2002 | Russo |
| 6,685,085 | B2 | 2/2004 | Hanna |
| 6,797,364 | B2 | 9/2004 | Okada et al. |
| 6,948,651 | B2 | 9/2005 | Ikeda |
| 6,968,971 | B2 | 11/2005 | Ely |
| 7,013,535 | B2 | 3/2006 | Tracy |
| 7,188,456 | B2 | 3/2007 | Knauseder |
| 7,302,150 | B2 | 11/2007 | Druckman et al. |
| 7,416,363 | B2 | 8/2008 | Kozhuez |
| 7,534,501 | B2 | 5/2009 | Durney |
| 7,887,249 | B2 | 2/2011 | Schmitz |
| 7,963,038 | B2 | 6/2011 | Schmitz |
| 2007/0289246 | A1 | 12/2007 | Schmitz |
| 2007/0289248 | A1 | 12/2007 | Schmitz |
| 2009/0110879 | A1 | 4/2009 | Lewis et al. |

FOREIGN PATENT DOCUMENTS

| | | |
|---|---|---|
| WO | 9410406 A1 | 5/1994 |
| WO | 2004104314 A2 | 12/2004 |
| WO | 2008105789 A2 | 9/2008 |

OTHER PUBLICATIONS

U.S. Appl. No. 11/424,246, filed Jun. 15, 2006, Schmitz.

International Search Report, dated Feb. 2, 2009, regarding Application No. PCT/US2007/014122 (WO 2008105789), 6 pages.

PCT Application No. PCT/US2007/014122, filed Jun. 14, 2007, 27 pages.

USPTO Office Action, dated Oct. 26, 2009, regarding U.S. Appl. No. 11/424,246, 14 pages.

USPTO Final Office Action, dated Apr. 15, 2010, regarding U.S. Appl. No. 11/424,246, 11 pages.

USPTO Office Action, dated Jul. 28, 2010, regarding U.S. Appl. No. 11/424,246, 8 pages.

USPTO Notice of Allowance, dated Jan. 5, 2011, regarding U.S. Appl. No. 11/424,246, 6 pages.

USPTO Notice of Allowance, dated Jul. 9, 2010, regarding U.S. Appl. No. 11/727,762, 9 pages.

USPTO Notice of Allowance, dated Apr. 6, 2011, regarding U.S. Appl. No. 11/727,762, 11 pages.

USPTO Office Action, dated Dec. 8, 2011, regarding U.S. Appl. No. 12/253,957, 9 pages.

Response to Office Action, dated Mar. 6, 2012, regarding U.S. Appl. No. 12/253,957, 6 pages.

USPTO Notice of Allowance, dated Mar. 20, 2012, regarding U.S. Appl. No. 12/253,957, 7 pages.

* cited by examiner

METHOD TO CREATE BENDS IN COMPOSITE PANELS

BACKGROUND INFORMATION

1. Field

The present disclosure relates generally to aircraft and in particular to manufacturing components for an aircraft. Still more particularly, the present disclosure relates to a method and apparatus for creating bends in composite panels for an aircraft.

2. Background

Aircraft are being designed and manufactured with greater and greater percentages of composite materials. Some aircraft may have more than fifty percent of its primary structure made from composite materials. Composite materials may be used in aircraft to decrease the weight of the aircraft. This decreased weight may improve payload capacities and fuel efficiencies. Further, composite materials may provide longer service life for various components in an aircraft.

Composite materials may be tough, light-weight materials, created by combining two or more dissimilar components. For example, a composite may include fibers and resins. The fibers and resins may be combined to form a cured composite material. By using composite materials, portions of an aircraft may be created in larger pieces or sections. For example, a fuselage in an aircraft may be created in cylindrical sections that may be put together to form the fuselage of the aircraft. Other examples may include, without limitation, wing sections joined to form a wing or stabilizer sections joined to form a stabilizer.

Further, interior components of the aircraft also may be made from composite materials. For example, composite panels may be used, without limitations, in floor panels, lavatories, walls, closets, dividers between seating sections, and headers above doorways in an aircraft. In the interior of an aircraft, the composite panels may have an angled section or shape. This angled shape is also referred to as a bend, and may be created by the intersection of two separate composite panels. In other examples, the angled shape may be created from a single panel.

Currently, a composite panel, in which an angled shape is desired, maybe bent to form the angled shape. This angled shape may be, for example, without limitation, an L-shape or around a ninety degree angle. The composite panel may be laid up on a mold or other suitable tool in the bent or angled shape. This composite material may then be cured to form the composite panel with the angled shape. This type of process, however, may require a separate mold or other suitable tool for each particular part.

Having a mold or other suitable tool for each configuration of a composite panel may be costly and complex. Also, if the location and/or angle of a bend changes for a composite panel, a new mold or other suitable tool may be used to create the composite panel with the change. This change requires additional time and cost.

Accordingly, there is a need for a method and apparatus for minimizing the complexity needed to create composite panels with a bent shape, which overcomes the problems discussed above. Embodiments of the disclosure are intended to satisfy this need.

SUMMARY

The different advantageous embodiments provide a method and apparatus for forming a bend in composite panel. In one advantageous embodiment, a method is used to form a bend in a composite panel. An angle and a radius bend are identified for the bend. A location of the bend in the composite panel is identified. A slot is cut having a curved flange in the composite panel at the identified location in a single pass through the composite panel with a tool, wherein the curved flange has a shape with a bend allowance width and a bend slot width. The bend allowance width is $BA=2\pi*A/360$, wherein BA is the bend allowance width, R is a corner radius, and A is a bend angle. The bend slot width is $BS=BA-2K(R-T)$, wherein K is $Tan(A/2)$ and T is a thickness of the composite panel. The composite panel with the slot is bent to form the bend.

In another advantageous embodiment, a method is used to form a bend in a composite panel. A location for the bend is identified on the composite panel. A slot having a curved flange is formed in the composite panel. The composite panel with the slot is bent to form the bend.

In yet another advantageous embodiment, an apparatus comprises a first layer, a filler layer, and a second layer. A slot having a curved flange is present within the first layer and the filler layer.

In still yet another advantageous embodiment, a panel processing apparatus comprises a cutter and a slot forming tool capable of forming a slot having a curved flange in a panel with the cutter.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
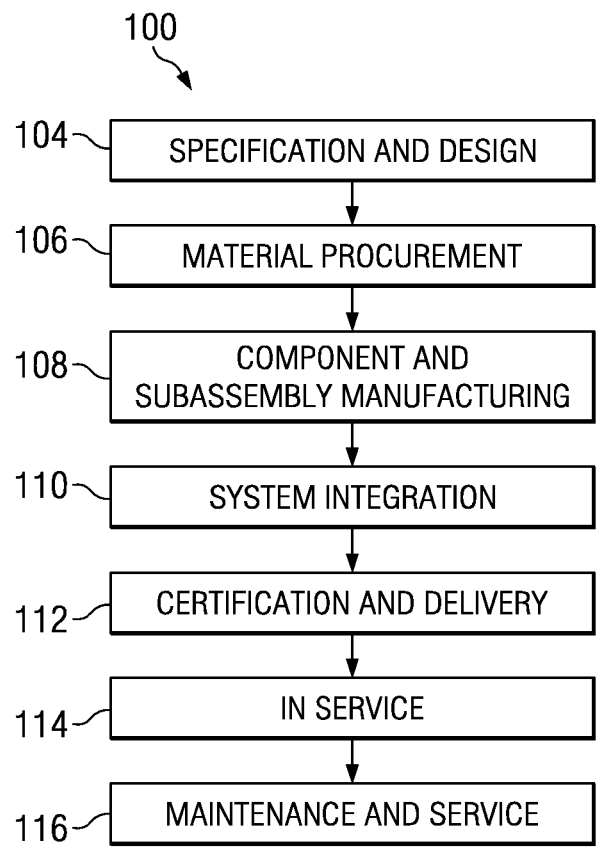
FIG. 1 is a flow diagram of aircraft production and service methodology in which an advantageous embodiment may be implemented.
Figure 2:
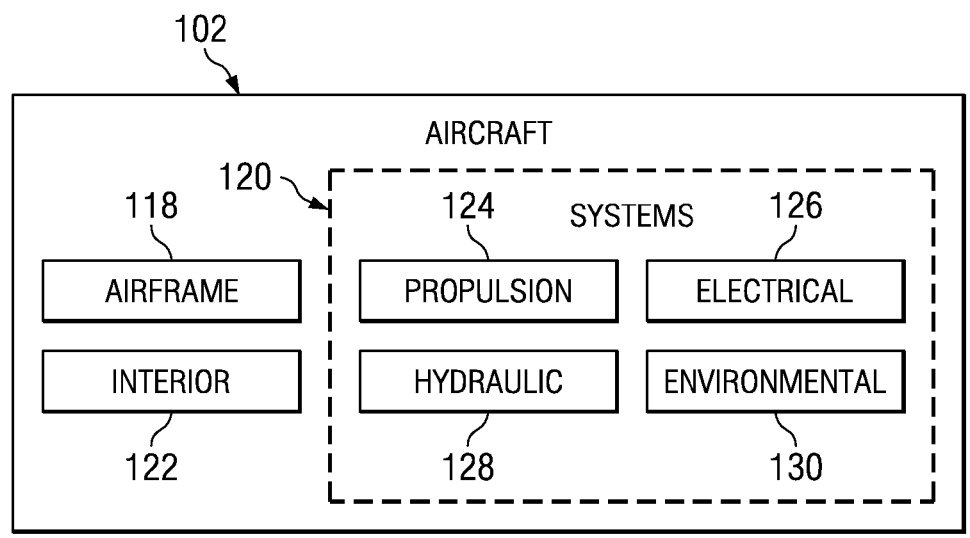
FIG. 2 is a block diagram of an aircraft in accordance with an advantageous embodiment.

Referring more particularly to the drawings, embodiments of the disclosure may be described in the context of aircraft manufacturing and service method 100 as shown in FIG. 1 and aircraft 102 as shown in FIG. 2. During pre-production, exemplary method 100 may include specification and design 104 of aircraft 102 and material procurement 106. During production, component and subassembly manufacturing 108 and system integration 110 of aircraft 102 takes place. Thereafter, aircraft 102 may go through certification and delivery 112 in order to be placed in service 114. While in service 114 by a customer, aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 102 produced by exemplary method 100 may include airframe 118 with a plurality of systems 120 and interior 122. Examples of high-level systems 120 include one or more of propulsion system 124, electrical system 126, hydraulic system 126, and environmental system 130. Any number of other systems may be included. Although an aerospace example is shown, the principles of the disclosure may be applied to other industries, such as the automotive industry.

Apparatus and methods embodied herein may be employed during any one or more of the stages of production and service method 100. For example, components or subassemblies corresponding to production process 108 may be fabricated or manufactured in a manner similar to components or subassemblies produced while aircraft 102 is in service. Also, one or more apparatus embodiments, method embodiments, or a combination thereof may be utilized during production stages 108 and 110, for example, by substantially expediting assembly of or reducing the cost of aircraft 102. Similarly, one or more of apparatus embodiments, method embodiments, or a combination thereof may be utilized while aircraft 102 is in service, for example and without limitation, to maintenance and service 116.

The different advantageous embodiments recognize that the current methods for creating bends in composite panels may be time consuming and costly. The different advantageous embodiments recognize that manufacturing and creating composite panels by curing the composite panels with the desired angle may be complex, requiring a tool for each part and desired angle.

Thus, the different advantageous embodiments provide a method and apparatus for forming a bend in a composite panel. A location may be identified for the bend in the composite panel. A slot having a curved flange is formed at the location in the composite panel. The composite panel may then be bent to form the bend. In these examples, the curved flange may be designed to minimize the amount of space left within the composite panel when the composite panel is bent into an angled shape.

Figure 3:
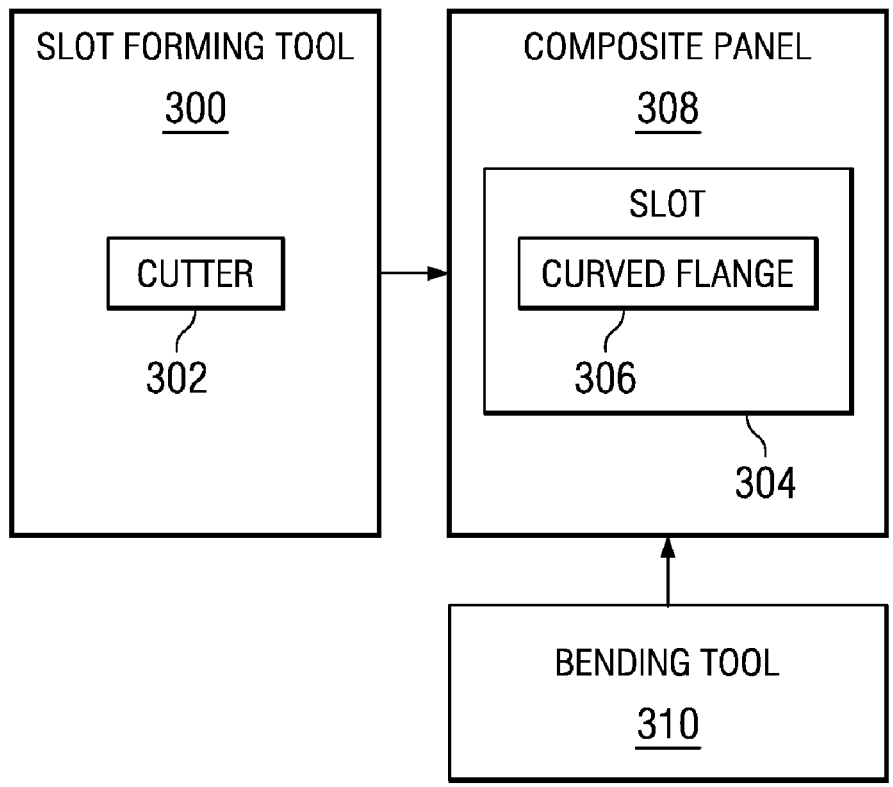
FIG. 3 is a block diagram of components used to create bends in composite panels in accordance with an advantageous embodiment.

With reference now to FIG. 3, a block diagram of components used to create bends in composite panels is depicted in accordance with an advantageous embodiment. In this example, slot forming tool 300 may include cutter 302. Slot forming tool 300, with cutter 302, may be used to cut slot 304 with curved flange 306 in composite panel 308. Composite panel 308 may then be bent into the desired shape. Bending tool 310 may not be required, in these examples. Composite panel 308 may be bent into the desired shape by hand, without any other tools. In some embodiments, bending tool 310 may be, for example, a computer or human controlled machine that bends composite panel 308 into the desired shape for assembly with other components. In another example, bending tool 310 may merely be a mold on which composite panel 308 may be bent for further processing.

In these examples, slot forming tool 300 may take various forms. For example, without limitation, slot forming tool 300 may be a computer numerical control (CNC) router. A non-limiting example of a computer numerical control that may be implemented as slot forming tool 300 may be a Cincinnati Milacron 3-Access Computer Numerical Control Router, which is available from MAG Cincinnati. Of course, any numerical control (NC) or manual router capable of cutting slot 304 may be used. In other non-limiting examples, slot forming tool 300 may be implemented using a handheld or hand controlled router.

In the different advantageous embodiments, slot 304 with curved flange 306 is formed with cutter 302. Cutter 302 may have a shape for slot 304 with curved flange 306 such that movements of cutter 302 through composite panel 308 form slot 304 with curved flange 306. In these examples, composite panel 308 may already be cured.

Figure 4:
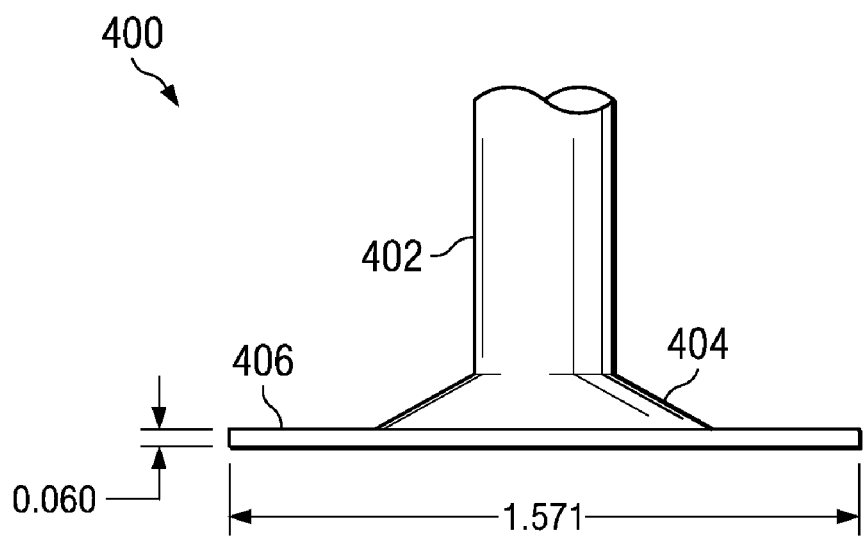
FIG. 4 is an illustration of a cutter in accordance with an advantageous embodiment.

Turning now to FIG. 4, an illustration of cutter 400 is depicted in accordance with an advantageous embodiment. Cutter 400 is an example cutter 302 used by slot forming tool 300 in FIG. 3. In this example, cutter 400 has shaft 402 and flanged end 404. Cutter 400 may be used to create a slot, such as slot 304 in FIG. 3. Flanged end 404 may have a width or diameter that may be around 1.571 inches, in this example. Further, edge 406 of flanged end 404 may have a thickness of around 0.06 inches.

In this example, the dimensions of cutter 400 may be used to process a composite panel that may be around 0.5 inches thick to form a radius bend of 1.0 inches. A radius bend is a radius corresponding to the curvature of a bent panel, in these examples. The curvature may be measure from the inside or outside surface of the bend. Cutter 400 may be made from different materials, such as, for example, without limitation, steel, aluminum composite, or any other suitable material. These and other dimensions provided in the various advantageous embodiments are merely examples of one implementation. Other advantageous embodiments may use other dimensions or parameters.

Figure 5:
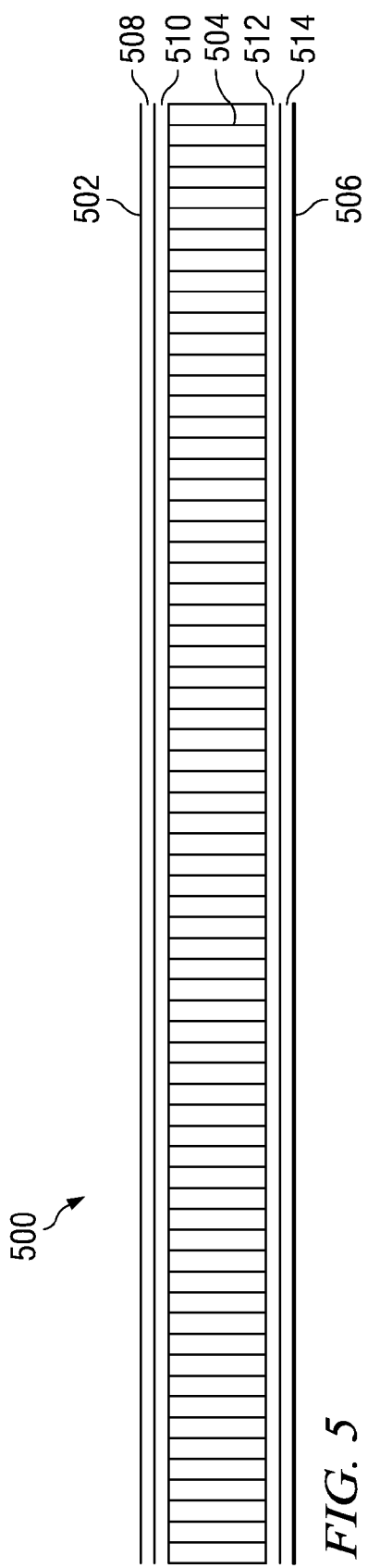
FIG. 5 is an illustration of a cross-sectional view of a composite panel in accordance with an advantageous embodiment.

Turning now to FIG. 5, an illustration of a cross-sectional view of composite panel 500 is depicted in accordance with an advantageous embodiment. In this example, composite panel 500 may be a composite panel similar to composite panel 308 in FIG. 3. Composite panel 500 may include composite layer 502, also referred to as a first face sheet, filler layer 504, and composite layer 506 or second face sheet.

Composite layer 502 may be formed from two composite plies, plies 508 and 510. In a similar fashion, composite layer 506 also may include two composite plies, plies 512 and 514. The number of plies or sub-layers that form composite layers 502 and 506 may vary, depending on the particular implementation. For example, in some implementations, one ply may be used, while in other implementations three plies may be used. The exact number of plies may vary, depending on the particular use and/or implementation. Examples of orientations include, for example, without limitation, ply directions of 0 degrees, 45 degrees, and 90 degrees; and ply directions of 0 degrees, 60 degrees, and 90 degrees.

In these examples, the materials that may be used in composite layers 502 and 506 may take the form of a resin pre-impregnated fabric. This type of fabric also may be referred to as a pre-preg fabric. These types of reinforcements may take the form of woven fabrics, roving, and unidirectional tape. With this type of fabric, the resin and curing agent may be impregnated into a reinforcing fiber or material prior to layup. In these particular examples, composite layers 502 and 506 may be, for example, without limitation, resin pre-impregnated fabrics with polyester and fiberglass, phenolic and fiberglass, epoxy and carbon fiber, epoxy, fiberglass, metallic, foil, screen, or any other suitable material.

Filler layer 504 may be formed using a number of different materials. For example, without limitation, Nomex® fibers, fiberglass, arimid, metallic, or other suitable materials may be used for filler layer 504. In these examples, filler layer 504 also may have a shape of a honeycomb matrix to form a honeycomb core. Filler layer 504 may provide a structure to create the thickness desired for composite panel 500 without using heavy materials, such as those that may be found in composite layers 502 and 506.

In this example, composite panel 500 is around one inch thick. The thickness of composite panel 500 may vary, depending on the particular implementation. Examples of ranges include, for example, without limitation, between around 0.375 inches to around 1.5 inches, or any other suitable range.

Composite panel 500 may be, in other examples, a range from around 0.25 inches to around 2.5 inches thick. In these examples, the radius bend may be up to around 3.4 times the thickness of composite panel 500. With these ranges, composite panel 500 may have a bend radius of up to around 1.7 inches when composite panel 500 is around 0.5 inches thick. When composite panel 500 is around 1 inch thick, this panel may have a bend radius of up to around 3.47 inches when composite panel 500 is around 0.5 inches thick. These examples are merely for purposes of illustration and the dimensions may vary as implementations vary.

Figure 6:
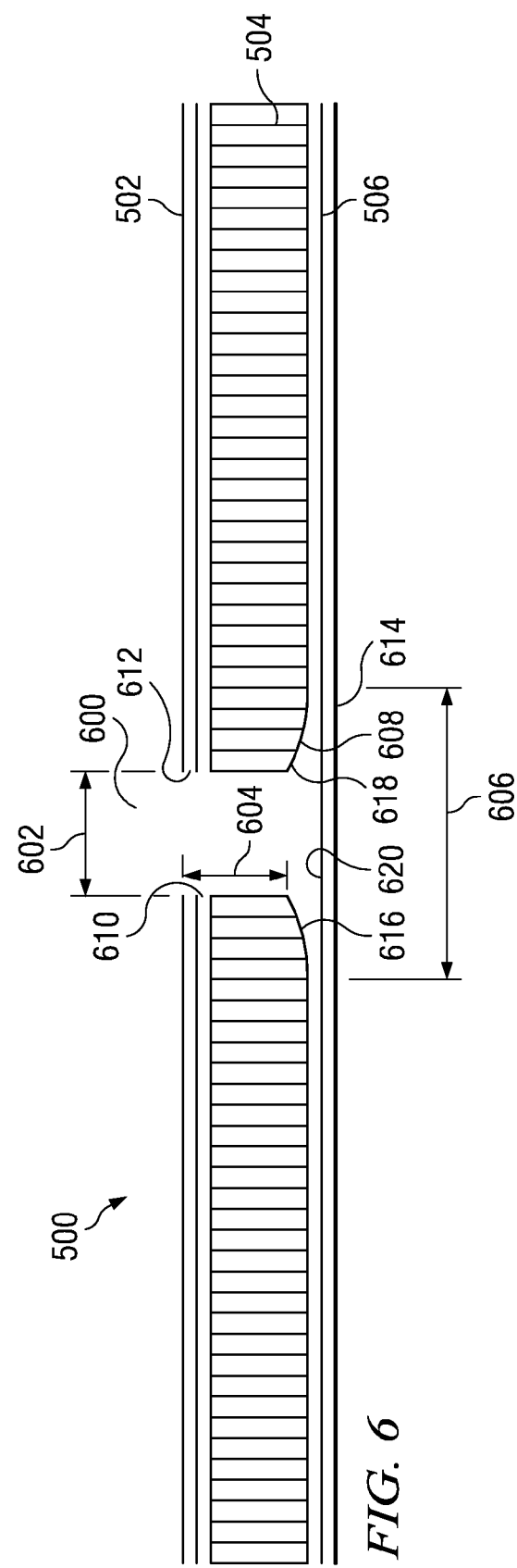
FIG. 6 is an illustration of a slot in accordance with an advantageous embodiment.

With reference now to FIG. 6, an illustration of slot 600 is depicted in accordance with an advantageous embodiment. In these examples, slot 600 may be formed after curing composite panel 500. A tool, such as cutter 400 in FIG. 4, may be used to form a slot within composite panel 500 in FIG. 5.

In this example, slot 600 may be been formed within composite panel 500. Slot 600 may be formed in a single pass of a tool, such as cutter 400 in FIG. 4, through composite panel 500 in FIG. 5. Slot 600 may have a width of bend slot width 602 along section 604. Thereafter, slot 600 widens in width to bend slot allowance width 606. The widening of the width of slot 600 increases to form curved flange 608. In this particular example, bend slot allowance width 606 may have a width of around 1.571 inches, corresponding to the width of flanged end 404 in cutter 400 in FIG. 4.

When composite panel 500 is bent, edges 610 and 612 meet while surface 614 may bend to form a curved surface. Surface 616 and surface 618, in filler layer 504, touch surface 620 of composite layer 506 when composite panel 500 is moved into a bent configuration. The configuration of slot 600 with curved flange 608 may allow composite panel 500 to be bent at an angle in a manner that reduces or minimizes the amount of open space within slot 600 when composite panel 500 is bent into an angled shape.

In these examples, a curve of surfaces 616 and 618 may reduce the amount of space present in slot 600 when composite panel 500 is bent into the desired configuration. The curve of surfaces 616 and 618 may be configured or selected in a manner that reduces the amount of open space within composite panel 500 when composite panel 500 is in the angled shape. The curve of surfaces 616 and 618 may have a curve that is similar to a desired radius bend for composite panel 500 when composite panel 500 is in the angled shape. In other words, curves for surfaces 616 and 618 may have a radius bend around or substantially the same as a radius bend for composite panel 500 in the angled shape.

Figure 7:
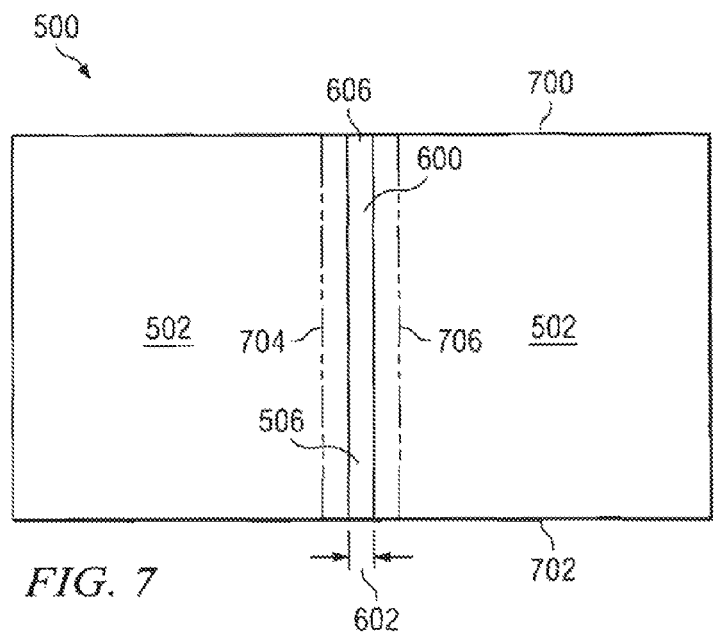
FIG. 7 is an illustration of a top view of a composite panel in accordance with an advantageous embodiment.

Turning now to FIG. 7, an illustration of a top view of composite panel 500 is depicted in accordance with an advantageous embodiment. As can be seen in this particular example, slot 600 may extend from side 700 to side 702 of composite panel 500. In creating slot 600, a cutter tool, such as cutter tool 400 in FIG. 4, may be moved along composite panel 500 from side 700 to side 702 to create slot 600. Dotted lines 704 and 706 may illustrate the location of bent slot allowance 606, which is not visible in this view.

Figure 8:
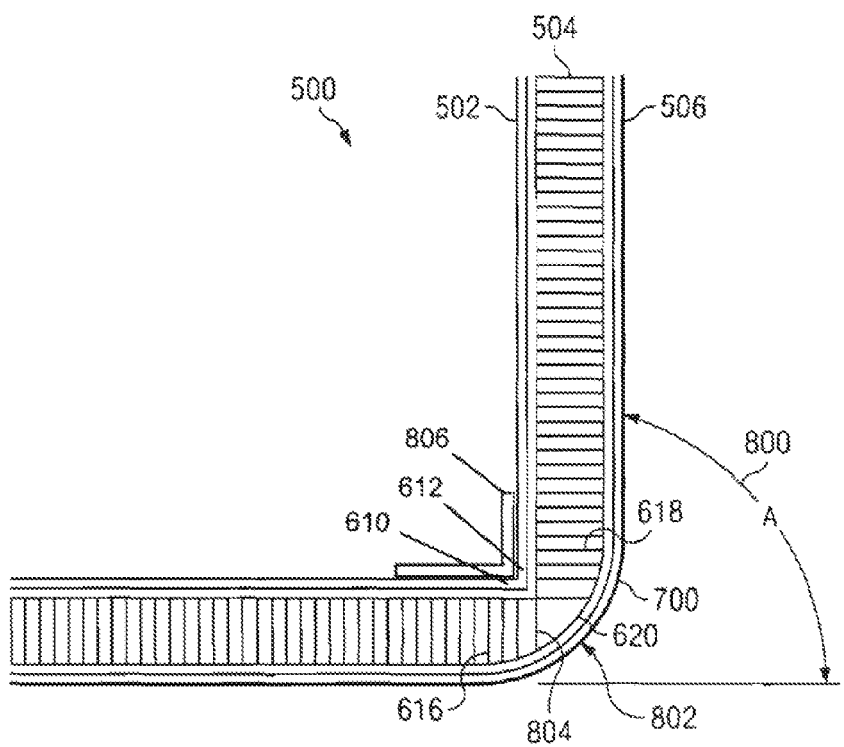
FIG. 8 is an illustration of a composite panel in a bent configuration in accordance with an advantageous embodiment.

Turning now to FIG. 8, an illustration of composite panel 500 in a bent configuration is depicted in accordance with an advantageous embodiment. In this example, composite panel 500 may have angle 800. This angle is around ninety degrees, in this example. Angle 800, of course, may vary, depending of the particular embodiment. For example, angle 800 may be seventy-five degrees, eighty degrees, one-hundred twenty degrees, or any other suitable angle. The selection of angle 800, as well as other parameters, such as, for example, without limitation, the thickness of composite panel 500 and the desired corner radius of curved section 802, may affect the parameters for the curve of surfaces 616 and 618.

As can be seen in this example, edges 610 and 612 in composite panel 500 may meet and touch each other with composite panel 500 in the angled shape. Surface 614 of composite layer 506 now may have a radius bend at section 802, which may also be referred to as a corner radius. In the angled shape, surface 616 and surface 618, in filler layer 504, may touch or meet surface 620 of composite layer 506. In some embodiments, a single or multiple ply bend composite doubler may be bonded over the intersection of edge 610 and edge 612. In other embodiments, an aluminum angle bracket 806 may be fastened or bolted over the joint or bend.

In this depicted example, channel 804 may be present within composite panel 500. In the different advantageous embodiments, the size or volume of channel 804 may be reduced or minimized through the configuration of slot 600 with curved flange 608. By reducing the volume or size of channel 804, a need for placing a filler into channel 804 may be minimized or avoided.

Depending on the configuration of slot 600, a filler may be required, in some advantageous embodiments. These other embodiments may employ a substantially straight surface to form a flange that is straight, rather than curved, such as curved flange 608 in FIG. 6. By using a filler, however, the time needed to manufacture composite panel 500 may increase because of the time needed to cure the filler. Further, the use of a filler also may add weight to composite panel 500.

Figure 9:
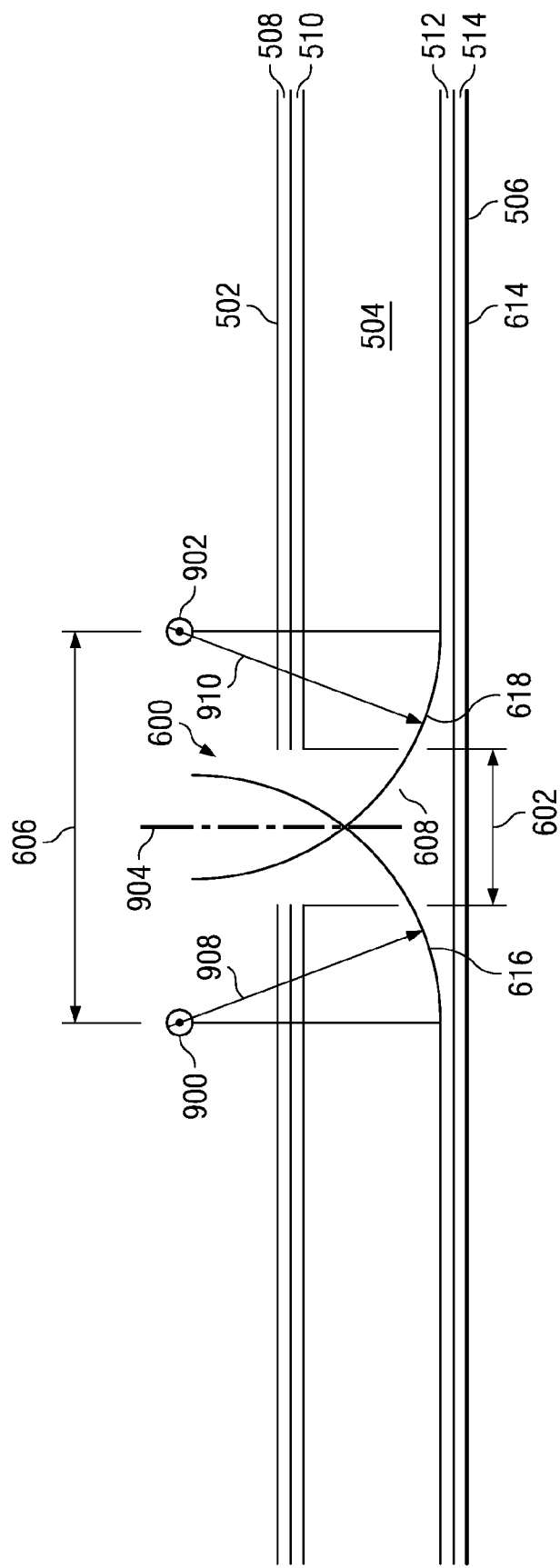
FIG. 9 is an illustration of parameters that may be used to select the configuration for a slot with a curved flange in accordance with an advantageous embodiment.

With reference now to FIG. 9, an illustration of parameters that may be used to select the configuration for slot 600 with curved flange 608 is depicted in accordance with an advantageous embodiment. In these examples, bend slot width 602 may be identified using the following:

$$BA = 2\pi R * \frac{A}{360}$$

BA may be bend slot allowance width 606 and R may be the corner radius. In this example, A may be an end angle, such as angle 800 in FIG. 8.

In these examples, bend slot width 602 may be selected as follows:

$$BS = BA - 2K(R-T)$$

BS may be the bent slot width, BA may be the bend allowance width, K may be TAN(A/2), and T may be the thickness of composite panel 500.

The curve of surfaces 616 and 618 may be selected as an intersection of the cut between bend slot allowance width 606 and a radius as described in the following. In this particular example, surface 618 may be defined as a selected distance from a center of radius for points 900 and 902. Points 900 and 902 may be selected as being the same distance from centerline 904. In these examples, points 900 and 902 may be located at distance of around one-half of bent slot allowance width 606 from centerline 904.

Additionally, points 900 and 902 may be selected to be a distance vertical from surface 614 of composite layer 506. In these examples, the vertical distance may be the value of the radius selected for the angled shape of composite panel 500. In these examples, the radius may be around one inch. As a result, points 900 and 902 may be around one inch away from composite layer 506. In this example, points 900 and 902 are the radius value above the bottom of composite layer 506.

Each portion of surface 616 has a distance that is substantially or around distance 908 from point 900. In a similar fashion, each point along surface 618 may have distance 910 from point 902. In these examples, distances 908 and 910 may be the same values and may be selected as being the radius value desired for composite panel 500. In other words, surfaces 616 and 618 have a configuration or shape that may be similar to the radius bend for surface 614 when composite panel 500 is in the angled shape.

By designing surfaces 616 and 618 in this manner, the amount of filler layer 504 remaining may be decreased, minimized, or eliminated. Consequently, the space present in slot 600 may be minimized when composite panel 500 is placed into the angled shape.

In these examples, surfaces 616 and 618 are illustrated as being curves that are smooth. In other advantageous embodiments, these surfaces may be formed with segments rather than an entirely smooth curve. Further, the different measurements and points described above are presented for purposes of illustrating non-limiting examples of configurations for slot 600. These selected configurations may then be used to create a tool, such as cutter 400 in FIG. 4, to create slot 600 in the desired shape.

Figure 10:
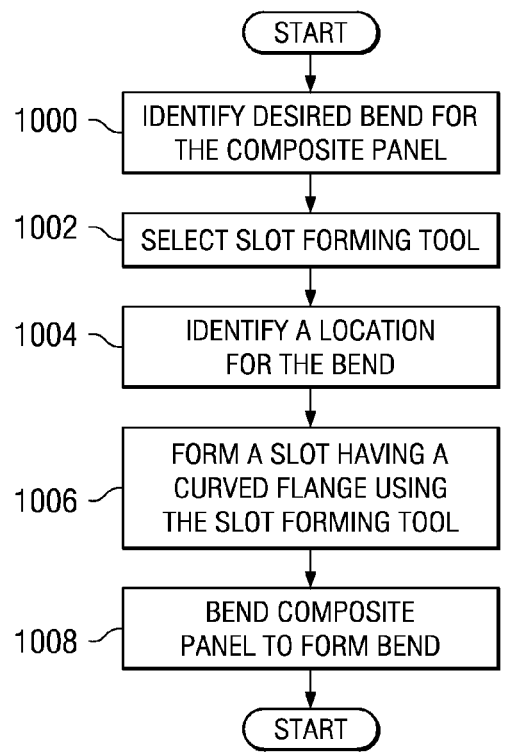
FIG. 10 is a flowchart of a process for forming a bend in a composite panel in accordance with an advantageous embodiment.

With reference now to FIG. 10, a flowchart of a process for forming a bend in a composite panel is depicted in accordance with an advantageous embodiment. The process, in this example, may be performed using components, such as slot forming tool 300 and bending tool 310 in FIG. 3, or other suitable tools. These tools may be used to create a composite panel, such as composite panel 500 in FIG. 5, in an angled shape as illustrated in FIG. 8.

The process begins by identifying a desired bend or angled shape for the composite panel (operation 1000). In the different illustrative examples, the bend may be a ninety degree bend for the composite panel. Of course, bends of other angles may be selected for the angled shape of the composite panel. For example, without limitation, the bend in the composite panel may be seventy degrees, one-hundred twenty degrees, or some other suitable angle. Limitations on bend angles may be present based upon the core and the face sheet thickness.

The process then selects a slot forming tool (operation 1002). In these examples, the slot forming tool may be a router with particular cutter that has an appropriate shape or some other suitable tool to form a slot with a curved flange that is appropriate for the desired angle in the bend. Thereafter, a location for the bend is identified (operation 1004).

The process then forms a slot having a curved flange in the composite panel using the slot forming tool (operation 1006). The slot forming tool forms a slot across one width of the composite panel. Thereafter, the process bends the composite panel to form the bend for the angled shape of the composite panel (operation 1008), with the process terminating thereafter. In this example, the bend may optionally be made using bending tool 310 in FIG. 3. Once the composite panel is bent, the composite panel in the bent shape may be installed or attached in a location. These composite panels may be used for various components, such as, for example, without limitation, a closet of an aircraft. When the portions of the composite panel are secured or fastened in place, the bend radius may maintain its shape without any fillers or additional reinforcements.

Further, if the radius bend and/or angle of the composite panel changes, a redesign of the composite panel is unnecessary. A selection or creation of a new tool with selected values for the bend slot width and the bend slot allowance may be used to form a slot that can be bent at the desired radius bend and/or angle. Also, the shape for the slot may be formed in a single pass of a tool and does not require any complex cutting of tabs.

Thus, the different advantageous embodiments provide a method and apparatus for forming a bend in a composite panel. The process may form a bend in the composite panel by identifying the location of the bend, forming a slot having a curved flange, and bending the panel to form the bend.

Further, although the different advantageous embodiments have been shown with respect to a composite panel, the different processes may be applied to other types of panels. For example, this type of process may be applied to a panel of sheetrock, plywood with a plastic laminate, or other suitable materials. The panel may be a solid panel or may have a solid core, depending on the particular implementation.

The different advantageous embodiments also allow for different radius bends to be used. The radius bends may be large, such as, for example, a radius bend that is around 3.4 times the thickness of the panel. These large bends are provided using the different advantageous embodiments without requiring extra tooling or fillers to be placed into the panel to hold or maintain the shape of the radius bend.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for forming a bend in a composite panel having a first layer, a core, and a second layer, the method comprising:

removing a portion of the first layer and the core with a cutter tool so as to form a first curved surface in the core and a second curved surface in the core, the first curved surface characterized by a first radius, and the second curved surface characterized by a second radius, so as to define a bend slot width in the first layer and the core and so as to define a bend slot allowance width in the core, the bend slot allowance width proximate the second layer, and the bend slot width being narrower than the bend slot allowance width; and bending the composite panel to form a bend radius in the composite panel such that the bend radius substantially matches the first radius and the second radius.

2. The method of claim 1 further comprising the step of disposing a support proximate the bend radius of the panel.

3. The method of claim 2 wherein the support comprises one selected from the group consisting of a doubler and a bracket.

4. The method of claim 2 wherein the bending of the composite panel forms an intersection of a first edge and a second edge of the composite panel and wherein the support is attached to the composite panel proximate the intersection.

5. The method of claim 2 wherein the support provides support and maintains the bend radius in the composite panel.

6. The method of claim 1 wherein the composite panel is characterized by a thickness and wherein the bend radius is greater than the thickness of the composite panel.

7. The method of claim 1 further comprising the steps of:
identifying an angle and a radius bend for the bend; and
identifying a location of the bend in the composite panel.

8. The method of claim 7 wherein the step of removing a portion of the core comprises cutting a slot having a curved flange in the composite panel at the identified location in a single pass through the composite panel with a tool, wherein the curved flange has a shape with a bend allowance width and a bend slot width in which the bend allowance width is:

$$BA = 2\pi * A/360$$

wherein BA is the bend allowance width, R is a corner radius, and A is a bend angle and in which the bend slot width is:

$$BS = BA - 2K(R-T)$$

wherein K is Tan(A/2) and T is a thickness of the composite panel.

9. The method of claim 8 wherein the slot is configured such that after the bending step open space in the slot is substantially minimized.

10. The method of claim 8 wherein the slot further defines a first curved surface and a second curved surface in the composite panel and wherein the first curved surface and the second curved surface define a curvature substantially similar to the radius bend.

11. The method of claim 1, wherein the first layer comprising a resin pre-impregnated fabric.

12. A method for forming a bend in a composite panel wherein the composite panel comprises a first layer, a core, and a second layer, the method comprising:
identifying a location for the bend in the composite panel to form an identified location, the first layer of the composite panel comprising a resin pre-impregnated fabric;
removing a portion of the first layer and the core with a cutter tool so as to form a slot having a curved flange in the core of the composite panel at the identified location, the curved flange comprising a first curved surface in the core and a second curved surface in the core, and so as to define a bend slot width in the first layer and the core and so as to define a bend slot allowance width in the core, the bend slot allowance width proximate the second layer, and the bend slot width being narrower than the bend slot allowance width; and
bending the composite panel with the slot to form the bend so as to form a bend radius, wherein the bend radius is substantially the same as the first curved surface and the second curved surface.

13. The method of claim 12, wherein the curved flange has a bend allowance width larger than a bend slot width at the location.

14. The method of claim 13, wherein the bend allowance width is:

$$BA = 2\pi * A/360$$

wherein BA is the bend allowance width, R is a corner radius, and A is a bend angle.

15. The method of claim 14, wherein the bend slot width is:

$$BS = BA - 2K(R-T)$$

wherein K is Tan(A/2) and T is a thickness of the composite panel.

16. The method of claim 12, wherein the forming step comprises:
cutting the slot with a tool.

17. The method of claim 16, wherein the tool is a cutter having a shape corresponding to the bend allowance width, the bend slot width, the first curved surface, and the second curved surface.

18. The method of claim 17, wherein the cutter is attached to a computer numerical control router.

19. The method of claim 12, wherein the composite panel comprises a filler layer between a first composite layer and a second composite layer.

20. The method of claim 19, wherein the slot is formed in the first composite layer and the filler layer.

21. The method of claim 20, wherein the filler layer is a honeycombed panel.

22. The method of claim 12, wherein the composite panel with the bend is a part for an aircraft.

23. A method for forming a bend in a composite panel with a core, the method comprising:
removing a portion of the core with a cutter tool; and
bending the composite panel to form a bend radius in the composite panel, the bend allowance width being substantially:

$$BA = 2\pi * A/360$$

wherein BA is the bend allowance width, R is a corner radius, and A is a bend angle.

* * * * *